Aug. 17, 1954  S. LA ROSA  2,686,720
LASAGNA STRANDS
Filed Aug. 22, 1952

INVENTOR
Stefano La Rosa.
BY
ATTORNEY

Patented Aug. 17, 1954

2,686,720

UNITED STATES PATENT OFFICE 2,686,720

LASAGNA STRANDS

Stefano La Rosa, Woodhaven, N. Y., assignor to V. La Rosa & Sons, Inc., Brooklyn, N. Y., a corporation of New York Application August 22, 1952, Serial No. 305,731

4 Claims. (Cl. 99—85)

This invention relates to an alimentary product of Italian origin known by the name of "lasagna." Lasagna is made by extruding a macaroni paste of a dough-like consistency in the form of a ribbon which is subsequently cut into lengths or "strands" and dried to a state of brittleness. The edible product is prepared by first, pre-cooking the strands in boiling water, then coating them with cheese, and finally baking in an oven. The purpose of the pre-cooking step is to render the strands soft and pliable so that they may be fashioned by hand into various patterns, the strands customarily being arranged in stacked or layered form with the coatings of melted cheese filling the space between layers.

Lasagna was originally made by hand, the macaroni paste or dough being rolled or flattened until wafer-thin and then cut into smooth, flat strands. More recently the product has been commercially manufactured by extrusion from a die, sometimes with undulating, or ruffled marginal edges. When the ribbon of lasagna is made by either of these methods, the strands in drying curl and become extremely fragile so as to create difficulties in handling and packaging. Furthermore, when pre-cooked in boiling water the softened strands tend to cohere and to tangle and lump together, thus making the product troublesome to prepare in the home by the housewife.

It is an object of the present invention to overcome the above disadvantages by shaping the ribbon of lasagna so as to provide a series of longitudinal ribs or ridges upon at least one face thereof which serve to stiffen and strengthen the strands in a longitudinal direction and to render them more satisfactory for handling, packaging and cooking. Such strands, it has been discovered, have little or no tendency to curl during drying and possess greater resistance to crumbling and breakage in the dried, brittle state. Moreover, the strands during boiling are less liable to tangle and lump, and in the flexible softened state they possess sufficient inherent strength to allow them to be basket-woven or otherwise worked by hand into various patterns and designs without tearing, folding or sticking together.

Another object of the invention is to impart to the lasagna strands a shape such as to insure a better and more uniform distribution of the softened or melted cheese upon the surface of the strands during baking, and to reduce the tendency of the softened cheese to run out from between layers while the product is being baked or afterwards when the lasagna is sliced into portions for serving.

Other objects and advantages will be apparent from the following detailed description of a preferred embodiment of the invention, reference being had to the drawing in which.

Figure 1:
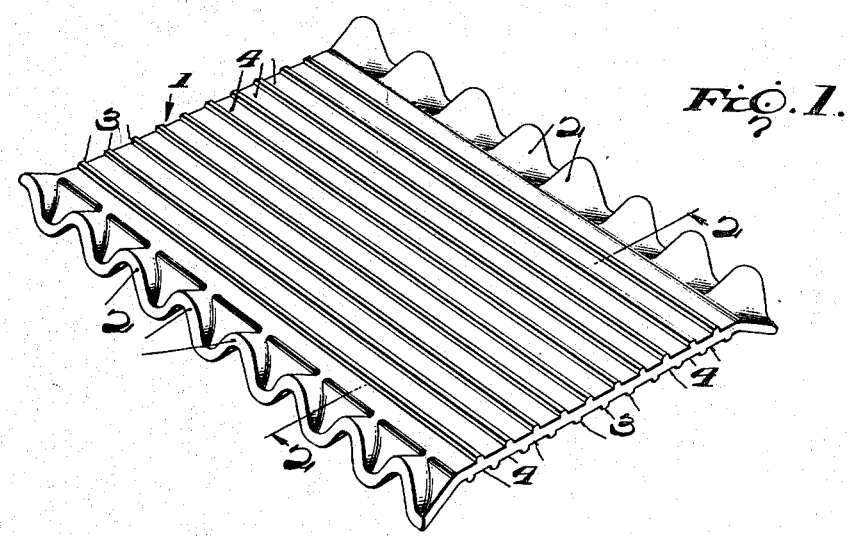
Figure 1 is a perspective view of a portion of a strand of lasagna.
Figure 2:
Figure 2 is a view in transverse cross-section of the strand taken on the line 2—2 of Figure 1.

In the form of the strand of lasagna illustrated in the drawing, the macaroni paste is extruded as a generally straight, flat ribbon 1 having its opposite marginal edges undulated to provide ruffles 2, the outer edges of which ruffles extend equidistantly above and below the plane of the strand, as best shown in Figure 2.

Formed integral with the ribbon of lasagna and extending lengthwise thereof upon its opposite faces are a series of upstanding continuous ribs 3, the ribs here being shown as straight and parallel and of semi-cylindrical cross-sectional shape. The ribs on each face are relatively widely spaced apart so as to provide flat-bottomed valleys 4 between adjacent ribs, and the ribs project a lesser extent above the plane of the strand than do the outer ends of the ruffles 2. The ribs upon opposite faces of the strand are arranged in laterally offset relation so that the ribs upon one face do not lie directly opposite the ribs upon the other face of the strand, thereby avoiding an excessive thickening of the strand throughout its transverse cross-section with the ribs on one face of the strand reinforcing the channels on its other face.

Figure 3:
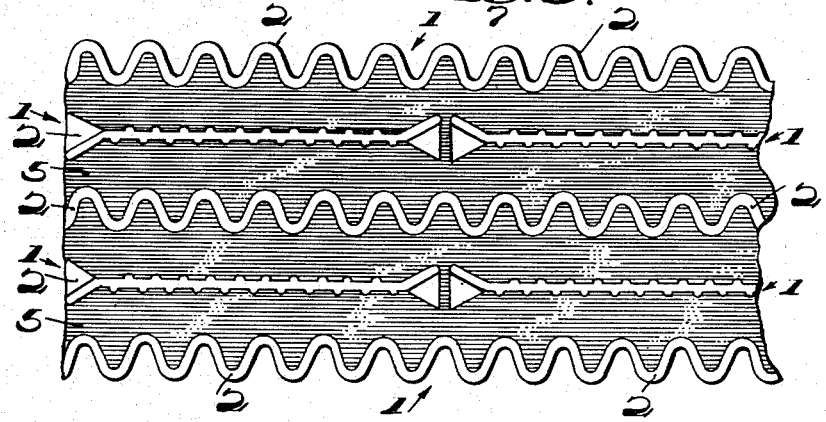
Figure 3 is a side view showing the manner in which the strands may be arranged in stacked formation with fillings of cheese therebetween ready for baking to produce the dish known as lasagna imbottite, or usually referred to in English as baked lasagna.

The strands 1 of lasagna after being heated in boiling water to render them soft and pliable may be arranged in superposed relation with fillings of cheese therebetween preparatory to baking to produce the style of product known as lasagna imbottite. By way of example, there is shown in Figure 3 a side view of a portion of lasagna imbottite in which some of the stacked strands 1 extend crosswise of the others with layers of cheese 5 between the strands, but the flexible lasagna strands are capable of being interwoven or otherwise fashioned into various other patterns and designs according to the fancy of the housewife. The layered product is then placed in the oven and baked which causes the cheese to soften or melt and to spread over the surfaces of the strands.

The ruffles 2 serve to maintain the superposed strands in spaced relation and to prevent too solid settling or compacting of the product during baking. However, there is a tendency for the softened cheese to run out from between the layers, especially along the sloping laterally-directed troughs defined by the marginal ruffles, and flow down the sides, thus imparting a messy appearance to the baked product.

The longitudinal ribs 3 serve to restrain the melted cheese against migration toward the margin edges of the strands and to guide its flow lengthwise along the valleys 4. As a consequence, the cheese is more or less completely confined within and uniformly distributed throughout the body of the product. Since lasagna is ordinarily served fresh from the oven, the ribs fulfill the additional purpose of anchoring the layers of cheese in place while the lasagna is being cut into portions and preventing the soft cheese from being squeezed out from between the layers.

From the foregoing description it will be apparent that the ribs 3 serve two main purposes: First, they strengthen the strands of lasagna in a longitudinal direction and, second, they provide channels for restraining the melted cheese against lateral flow without interfering with the flow of the cheese in a longitudinal direction.

Not only is the lasagna strengthened against curling and warping during drying following its extrusion in a plastic state from the die, but after it has passed through the drier and is in a brittle condition ready for marketing it is capable of withstanding the shocks incidental to handling, packaging and shipping with a minimum of breakage. Furthermore the product is more conveniently prepared by the housewife because of the greater resistance of the strands to breakage both in its brittle and in its softened conditions as a further result of the fact that the strands during the pre-cooking stage have less tendency to cohere and to lump and tangle when massed together in a boiler. The finally baked lasagna presents an attractive appearance because the melted cheese is prevented, or in any event restrained, from flowing out between the layers and is distributed more uniformly over the surfaces of the strands.

It is to be understood that the lasagna strands may take other forms than that illustrated and described herein, which is merely by way of example, without departing from the scope of the invention as defined by the following claims.

I claim:

1. An alimentary product of the class known as lasagna comprising a generally straight elongated ribbon of macaroni paste, said ribbon being formed with upstanding, longitudinally-extending strengthening ribs upon at least one of its faces.

2. An alimentary product of the character set forth in claim 1 in which the strengthening ribs are located upon its opposite faces in laterally offset relation.

3. An alimentary product of the character set forth in claim 1 in which the longitudinal marginal edges of the ribbon are formed as ruffles.

4. An alimentary product of the character set forth in claim 1 in which the strengthening ribs are of rounded transverse cross-section.

References Cited in the file of this patent

UNITED STATES PATENTS

| Number | Name | Date |
| --- | --- | --- |
| D. 96,161 | Cirillo | July 9, 1935 |
| 1,247,678 | Hentschel | Nov. 27, 1917 |
| 1,615,681 | Buhse et al. | Jan. 25, 1927 |